(12) United States Patent  (10) Patent No.: US 8,918,885 B2
McClure et al.  (45) Date of Patent: Dec. 23, 2014

(54) AUTOMATIC DISCOVERY OF SYSTEM INTEGRITY EXPOSURES IN SYSTEM CODE

(75) Inventors: James G. McClure, Poughkeepsie, NY (US); Karl D. Schmitz, Poughkeepsie, NY (US); Peter G. Spera, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 13/369,481

(22) Filed: Feb. 9, 2012

(65) Prior Publication Data

US 2013/0212682 A1  Aug. 15, 2013

(51) Int. Cl.
*G06F 21/00*  (2013.01)

(52) U.S. Cl.
USPC .......................................................... 726/25

(58) Field of Classification Search
USPC ............. 711/147, 152, 154, 156, 163, 164, 1, 711/100; 709/216; 717/124, 126, 127, 130, 717/131; 714/1, 3, 6.1, 25, 26, 28, 35, 37, 714/39
See application file for complete search history.

(56) References Cited

U.S. PATENT DOCUMENTS

| | | | | |
|---|---|---|---|---|
| 4,087,856 A | * | 5/1978 | Attanasio | 726/23 |
| 4,366,537 A | * | 12/1982 | Heller et al. | 711/164 |
| 4,439,830 A | * | 3/1984 | Chueh | 711/164 |
| 4,581,702 A | * | 4/1986 | Saroka et al. | 711/207 |
| 5,023,773 A | * | 6/1991 | Baum et al. | 710/220 |
| 5,142,679 A | * | 8/1992 | Owaki et al. | 717/151 |
| 5,163,096 A | * | 11/1992 | Clark et al. | 711/164 |
| 5,237,668 A | * | 8/1993 | Blandy et al. | 711/2 |
| 5,345,567 A | * | 9/1994 | Hayden et al. | 712/228 |
| 5,361,356 A | * | 11/1994 | Clark et al. | 711/206 |
| 5,454,086 A | * | 9/1995 | Alpert et al. | 712/227 |
| 5,493,661 A | * | 2/1996 | Alpert et al. | 711/208 |
| 5,615,327 A | * | 3/1997 | Magee et al. | 714/12 |
| 5,630,050 A | * | 5/1997 | Neuhard et al. | 714/27 |
| 5,745,676 A | * | 4/1998 | Hobson et al. | 726/23 |
| 5,774,729 A | * | 6/1998 | Carney et al. | 717/126 |
| 5,860,115 A | * | 1/1999 | Neuhard et al. | 711/147 |
| 5,875,484 A | * | 2/1999 | Neuhard et al. | 711/167 |
| 6,088,792 A | * | 7/2000 | Slegel et al. | 712/228 |
| 6,996,698 B2 | * | 2/2006 | Slegel et al. | 711/220 |
| 7,284,100 B2 | * | 10/2007 | Slegel et al. | 711/156 |

(Continued)

OTHER PUBLICATIONS

Author: IBM Title: z/Architecture Principles of Operation Date: Feb. 2008 Publisher: IBM Edition: 7th.*

(Continued)

*Primary Examiner* — Michael R Vaughan
*Assistant Examiner* — Richard McCoy
(74) *Attorney, Agent, or Firm* — Cantor Colburn LLP; William A. Kinnaman, Jr.

(57) ABSTRACT

A technique is provided for detecting vulnerabilities in system code on a computer. Supervisor call routines and program call routines of the system code are analyzed to determine which are available to a caller program that is an unauthorized program and has a PSW key 8-15. Predefined input parameters are provided to test cases for use by the supervisor call routines and the program call routines in order to generate an output for analysis. The output is analyzed to determine when supervisor call routines and/or program call routines performed a potential vulnerability action. The potential vulnerability action include reading from fetch protected storage, writing to system key (key 0-7) storage, and attempting to access unallocated storage while running with a PSW key 0-7.

21 Claims, 8 Drawing Sheets

(56) References Cited

U.S. PATENT DOCUMENTS

| | | | | |
|---|---|---|---|---|
| 7,305,410 | B2 * | 12/2007 | Skopec et al. | 1/1 |
| 7,325,252 | B2 * | 1/2008 | Bunker et al. | 726/25 |
| 7,360,131 | B2 * | 4/2008 | Walmsley | 714/718 |
| 7,437,766 | B2 * | 10/2008 | Cohen et al. | 726/26 |
| 7,581,074 | B2 * | 8/2009 | Greiner | 711/164 |
| 7,689,874 | B2 * | 3/2010 | Boch et al. | 714/51 |
| 7,725,894 | B2 * | 5/2010 | Check et al. | 718/1 |
| 7,793,346 | B1 * | 9/2010 | Daub | 726/22 |
| 7,814,372 | B2 * | 10/2010 | Huang et al. | 714/38.1 |
| 7,818,633 | B2 * | 10/2010 | Little | 714/53 |
| 7,908,019 | B2 * | 3/2011 | Ebrom et al. | 700/11 |
| 7,996,176 | B2 * | 8/2011 | McCoy | 702/122 |
| 8,032,790 | B2 * | 10/2011 | Chopra et al. | 714/32 |
| 8,041,923 | B2 * | 10/2011 | Greiner et al. | 711/206 |
| 8,155,120 | B2 * | 4/2012 | McCoy et al. | 370/392 |
| 8,156,346 | B2 * | 4/2012 | Kim | 713/190 |
| 8,176,279 | B2 * | 5/2012 | Farrell et al. | 711/163 |
| 8,176,280 | B2 * | 5/2012 | Farrell et al. | 711/163 |
| 8,301,815 | B2 * | 10/2012 | Farrell et al. | 710/104 |
| 8,364,912 | B2 * | 1/2013 | Farrell et al. | 711/152 |
| 2005/0097252 | A1 * | 5/2005 | Kelley et al. | 710/200 |
| 2006/0036824 | A1 * | 2/2006 | Greiner et al. | 711/164 |
| 2006/0090206 | A1 * | 4/2006 | Ladner et al. | 726/25 |
| 2008/0301647 | A1 * | 12/2008 | Neystadt et al. | 717/127 |
| 2009/0259794 | A1 * | 10/2009 | Huber et al. | 711/100 |
| 2011/0191854 | A1 * | 8/2011 | Giakouminakis et al. | 726/25 |
| 2011/0231936 | A1 | 9/2011 | Williams et al. | |
| 2012/0084560 | A1 * | 4/2012 | Jayaraman | 713/164 |
| 2012/0203984 | A1 * | 8/2012 | Woffinden | 711/154 |
| 2012/0255038 | A1 * | 10/2012 | Havercan | 726/30 |
| 2013/0024659 | A1 * | 1/2013 | Farrell et al. | 712/30 |

OTHER PUBLICATIONS

Author: IBM Title: z/Os Basic Skills Information Center: Security on z/OS Date: 2006/2010 Publisher: IBM.*

Disclosed Anonymously, "Using Static Analysis Results to Direct Dynamic Analysis for Security Testing," IP. com; IP.com No. IPCOM000209848D; Aug. 17, 2011; 7 pages.

M. Johns, et al. "Scanstud: A Methodology for Systematic, Fine-Grained Evaluation of Static Analysis Tools," 2011; pp. 1-8.

S. Murphy, et al., "BGP Security Vulnerabilities Analysis (RFC4272)," IP.com; IP.com No. IPCOM000133095D; Jan. 2006; Copyright The Internet Society (2006); 24 pages.

* cited by examiner

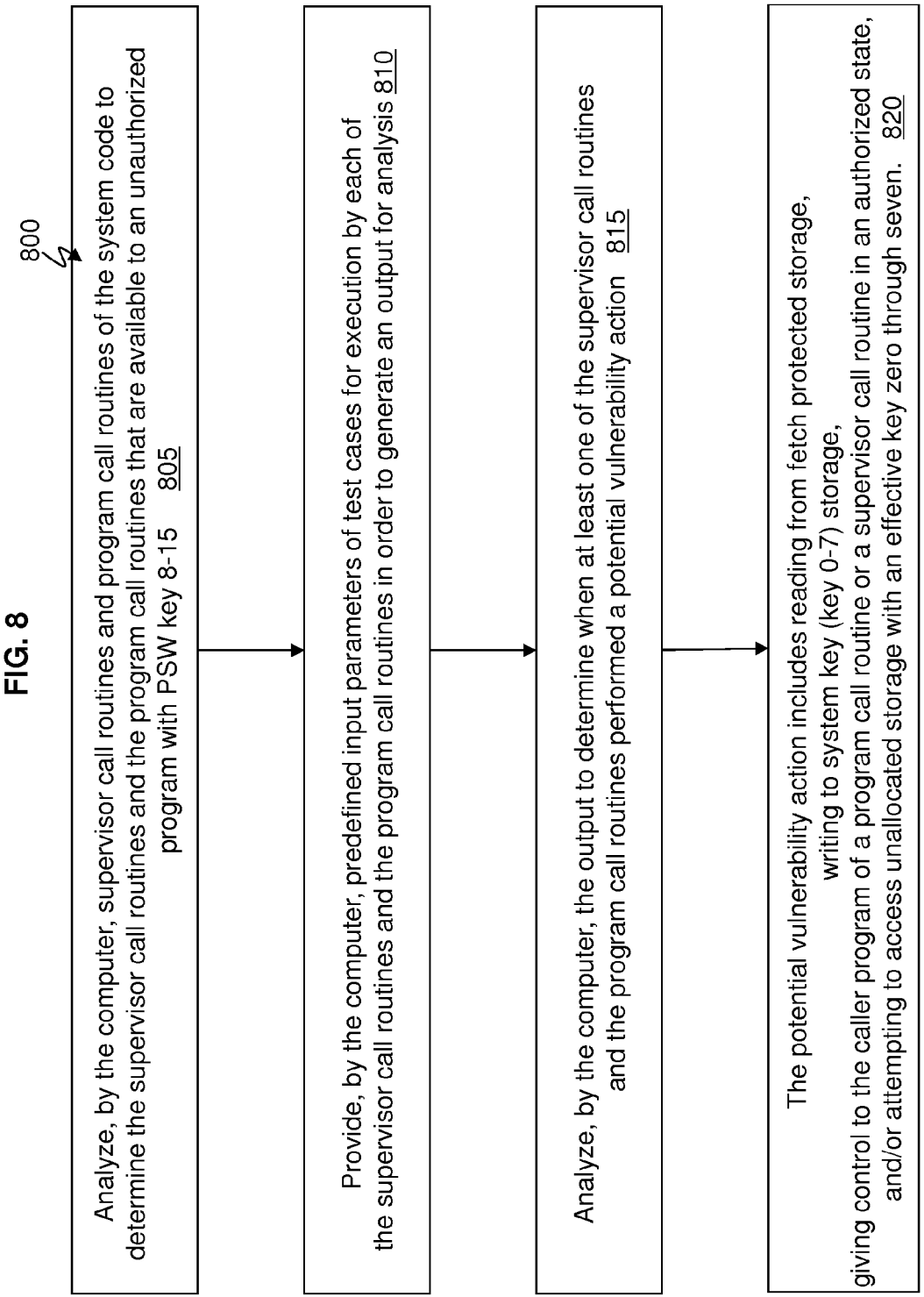

AUTOMATIC DISCOVERY OF SYSTEM INTEGRITY EXPOSURES IN SYSTEM CODE

BACKGROUND

Exemplary embodiments relate to system integrity, and more specifically, to detecting vulnerabilities in system code.

System integrity support restricts only unauthorized problem programs. It is the responsibility of the installation to verify that any authorized programs added to the system control program will not introduce any integrity exposures.

System z® hardware along with z/OS® include features and facilities specifically designed to protect one program from affecting another, either intentionally or accidentally. The ability of an operating system to protect data and itself from unauthorized changes is called system integrity.

An authorized program in the system is one that runs in PSW (Program Status Word) key 0-7, in supervisor state, and/or is authorized through the authorized program facility (APF). Examples of authorized programs in z/OS® (operating system) include supervisor call (SVC) routines and program call (PC) routines, most of which run in PSW key 0-7. An unauthorized program is a program that runs in PSW key 8-15 (typically key 8), in problem state, and is not APF authorized. System integrity support restricts only unauthorized programs.

BRIEF SUMMARY

According to an exemplary embodiment, a method for detecting vulnerabilities in system code on a computer is provided. The computer analyzes supervisor call routines and program call routines of the system code to determine the supervisor call routines and the program call routines that are available to a caller program, where the caller program is an unauthorized program and has a PSW key 8-15. The computer provides predefined input parameters of test cases for execution by each of the supervisor call routines and the program call routines in order to generate an output for analysis. The computer analyzes the output to determine when at least one of the supervisor call routines and the program call routines performed a potential vulnerability action. The potential vulnerability action includes at least one of reading from fetch protected storage, writing to system key (key 0-7) storage, and attempting to access unallocated storage while running with a PSW key 0-7.

According to an exemplary embodiment, a system for detecting vulnerabilities in system code is provided. The system includes memory configured to store a program and a processor, functionally coupled to the memory. The processor is responsive to computer-executable instructions contained in the program and operative to analyze supervisor call routines and program call routines of the system code to determine the supervisor call routines and the program call routines that are available to a caller program, where the caller program is an unauthorized program and having a PSW key 8-15. The processor provides predefined input parameters of test cases for execution by each of the supervisor call routines and the program call routines in order to generate an output for analysis. The processor analyzes the output to determine when at least one of the supervisor call routines and the program call routines performed a potential vulnerability action. The potential vulnerability action includes at least one of reading from fetch protected storage, writing to system key (key 0-7) storage, and attempting to access unallocated storage while running with a PSW key 0-7.

According to an exemplary embodiment, a computer program product for detecting vulnerabilities in system code on a computer is provided. The computer program product includes a computer readable storage medium having computer readable program code embodied therewith. The computer readable program code includes analyzing, by the computer, supervisor call routines and program call routines of the system code to determine the supervisor call routines and the program call routines that are available to a caller program, where the caller program is an unauthorized program and has a PSW key 8-15. The computer readable program code includes providing, by the computer, predefined input parameters of test cases for execution by each of the supervisor call routines and the program call routines in order to generate an output for analysis. The computer readable program code includes analyzing the output to determine when at least one of the supervisor call routines and the program call routines performed a potential vulnerability action. The potential vulnerability action includes at least one of reading from fetch protected storage, writing to system key (key 0-7) storage, and attempting to access unallocated storage while running with a PSW key 0-7.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 8 illustrates a method for providing test cases and analyzing results to determine system vulnerabilities in the source/system code according to an exemplary embodiment.

DETAILED DESCRIPTION

Figure 1:
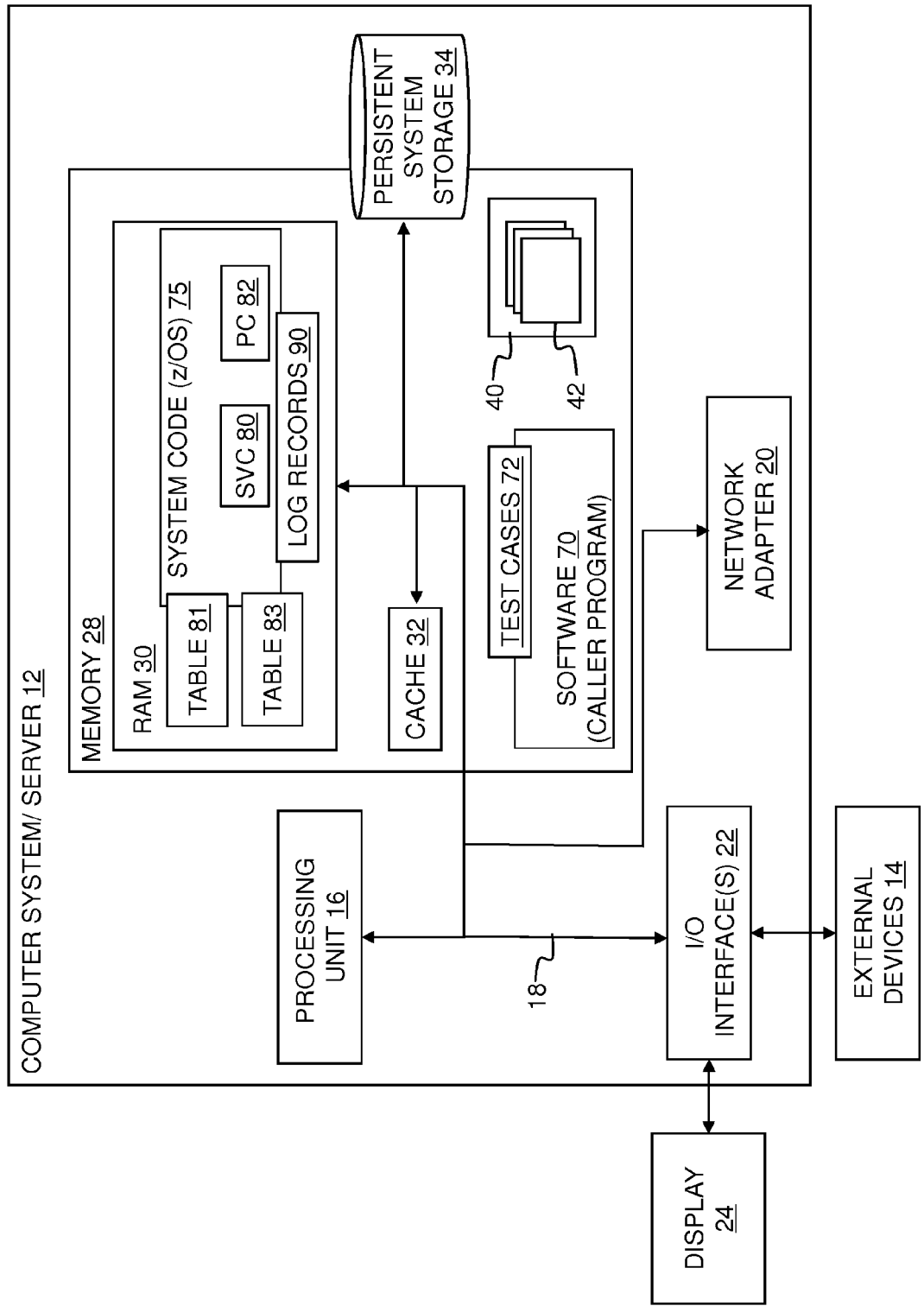
FIG. 1 illustrates a schematic of an example of a computer system/server in accordance with an exemplary embodiment.

Exemplary embodiments are configured to aid in the detection of security vulnerabilities in z/OS® authorized programs, primarily supervisor call (SVC), and program call (PC) routines. It is important to identify and remove these vulnerabilities since ill-intended users and/or unauthorized programs (which may be utilized interchangeably with caller program and caller) could exploit vulnerabilities to undermine z/OS® security and system integrity.

System integrity is defined as the inability of any program not authorized by a mechanism under the installation's control to circumvent/disable store or fetch protection, access a resource protected by the z/OS® Security Server (e.g., RACF®), and/or obtain control in an authorized state; that is, in supervisor state, with a PSW key less than eight (8), and/or Authorized Program Facility (APF) authorized.

The specific types of vulnerabilities identified by this disclosure violate one or more of the three basic system integrity rules identified in the z/OS® System Integrity Guidelines: "Programming Announcement Statement of MVS System Integrity" dated Oct. 21, 1981 and "z/OS V1R13.0 MVS Authorized Assembler Services Guide" both of which are herein incorporated by reference. The three basic system integrity rules include:

1. Authorized programs must behave predictably.
2. References to caller provided storage must be performed in the PSW key of the caller.
3. Control blocks (referencing memory) provided by unauthorized callers must be validated prior to use.

Currently, the process to detect such errors requires a great deal of manual intervention and very specific skill set which is limited to very few. The techniques used today include code inspection and analysis, as well as previously disclosed technology which is integrated into the system integrity scanners. Code scanning requires an emulation of the entire system and all its resources. The process to maintain these scanners is very time consuming to keep up-to-date. This type of code scanning also leads to many false positives, which turn out not to be true vulnerabilities. Determining which are true vulnerabilities require analysis by a highly skilled expert. Since the current rate of false positives from the current generation of scanner is in the range of greater than 60%, the human review time required is time consuming and the number of experts is too small when compared to the amount of code that must be reviewed each year.

However, exemplary embodiments describe one or more algorithms to analyze and detect potential system integrity vulnerabilities in an automated fashion with less human intervention and fewer false positives. Exemplary embodiments provide a means (software application 70 in FIG. 1) to detect unsafe storage references and branches, whereby the storage reference or branch violates the z/OS® Statement of System Integrity for IBM®. When compared to the current techniques, exemplary embodiments allow a relatively unskilled tester to identify problems, down to a specific line of code containing a vulnerability, with a high degree of confidence and accuracy. A skilled debugger can then elaborate on the problem, consider other implications of the problem, and propose a fix. The overall expenditure of human effort in this process is significantly less than other tools and methods, and the accuracy is much better. Finally, the process produces system dumps, which can be used to prove the existence of a system integrity violation, reducing the need for discussion and clarification when reporting the exposure to the product owner.

Referring now to FIG. 1, there is illustrated a schematic of an example of a computer system and/or server 12. The computer system/server 12 is only one example of a computing device and is not intended to suggest any limitation as to the scope of use or functionality of embodiments of the invention described herein. Regardless, the computer system/server 12 is capable of being implemented and/or performing any of the functionality set forth herein above and below.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, the components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, software application 70 includes one or more program modules 42 for executing the functions and/or methodologies discussed herein.

The software application 70 comprises one or more algorithms to implement exemplary embodiments. The software application 70 may be representative of one or more software applications configured to work together, e.g., over a distributed computing network. The software application 70 may be coupled to and/or reside in the memory 28 of computer system/server 12.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The computer system/server 12 may include the functionality of and/or be representative of the hardware and software components of numerous types of equipment. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2®, database software. (IBM, zSeries, pSeries, xSeries, BladeCenter, WebSphere, and DB2 are trademarks of International Business Machines Corporation registered in many jurisdictions worldwide).

The software application 70 provides a new process that consists of three phases which are combined to analyze authorized programs (SVC and PC routines in system code 75) and detect potential system integrity vulnerabilities. The first phase executed by the software application 70 is the identification of programming interfaces (SVC and PC routines) to test. The second phase executed by the software application 70 is an automated approach to driving carefully constructed test cases intended to trick SVC and PC routines in system code into violating system integrity guidelines. The third phase executed by the software application 70 analyzes the resulting log records (including System Diagnostic Work Area (SDWA)), storage content (at identified address locations), PSW key and state, and the program key mask for indications that the system integrity guidelines have been violated.

This automated approach allows for the unattended inspection of a target environment with limited human intervention. The software application 70 can be run as part of a specific component test and/or can be included as part of system test to ensure the quality of system code 75 in each release of IBM® operating system software including but not limited to z/OS® operating system software.

Figure 2:
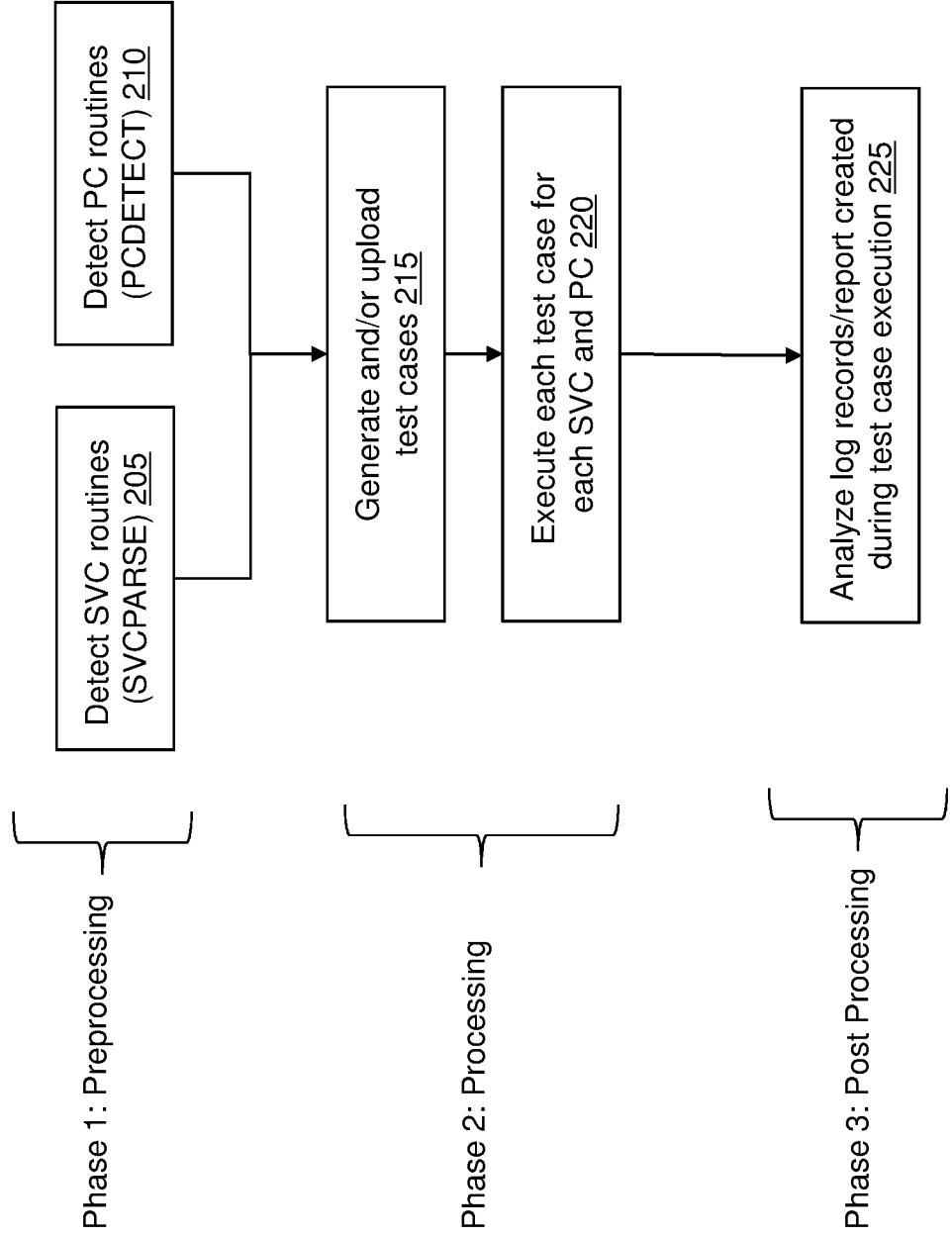
FIG. 2 illustrates a flow chart of the preprocessing phase, processing phase, and post processing phase in accordance with an exemplary embodiment.

FIG. 2 illustrates a tooling description 200 executed by the software application 70 of the computer system/server 12 according to an exemplary embodiment.

The software application 70 (which acts as the tester with test cases 72) utilizes tooling that may utilize a scripting language to invoke each PC and SVC routine with input parameters that can cause the SVC and PC routines to reveal a system integrity exposure. There is a main script in software application 70 that generates, runs, and records the results of the test cases 72. This main script of the software application 70 is invoked by the tester.

First, installed PCs and SVCs are detected programmatically by the software application 70 at blocks 205 and 210. The installed SVC routines may be listed in SVC table 81, and the installed PC routines may be in PC table 83. In one case, the software application 70 is configured to parse the SVC table 81 and PC table 83 to respectively determine SVC and PC routines that can be called (e.g., accessed and/or controlled) by unauthorized programs that are PSW key 8-15 callers. As a result, the software application 70 identifies SVC routines 80 as being able to be called by PSW key 8-15 programs in an unauthorized state and identifies PC routines 82 as being able to be called by PSW key 8-15 programs in an unauthorized state. These identified SVC routines 80 and identified PC routines 82 will be run against test cases 72.

For example, the SVC routines 80 can be detected by the SVCPARSE REXX script, and the PC routines 82 can be detected by the PCDETECT script. The software application 70 analyzes the list of SVC routines in the SVC table 81 and the PC routines in the PC table 83 to reduce the scope of testing to only those (i.e., to SVC routines 80 and PC routines 82) that are available to unauthorized programs.

The software application 70 is configured to generate and/or upload test cases 72 having predefined parameters to be run against each of the individual SVC routines 80 and each of the individual PC routines 82 at block 215. In one example, the test cases 72 including their respective parameters may be incorporated in the software application 70 and/or the test cases 72 may be separately stored in the memory 28.

For example, test cases 72 providing a set of predefined input parameters to each PC routine 82 and SVC routine 80 that gets executed. Some examples of such input parameters of the test cases 72 can include the following in Table 1:

TABLE 1

1. a register pointing to system key storage initialized to 00000000x, FFFFFFFFx, etc., with variations for non-fetch protected storage and fetch protected storage.
2. a register pointing to a parameter list such that a parameter points to system key storage initialized to 00000000x, FFFFFFFFx, etc., with variations for non-fetch protected storage and fetch protected storage.
3. a register pointing to unallocated storage, or a register pointing at a parameter list such that a parameter points to unallocated storage. This is important because a reference to unallocated storage causes an 0C4 abend which will be analyzed in post processing. An 0C4 abend is generated because of a hardware level interrupt when the unallocated storage is accessed.
4. a piece of code in common storage that attempts to change to system execution key.

Prior to calling each PC routine 82 and/or SVC routine 80, the test case 72 (implemented by the software application 70) switches to unauthorized, problem state, and PSW key 8-15 to simulate an unprivileged user/program.

The software application 70 is configured to execute the test cases 72 against each PC routine 82 and SVC routine 80 in which the software application 70 implements the caller program (e.g., the unauthorized program) at block 220. For example, the software application 70 is configured to implement the unauthorized program in an unauthorized state with a PSW key 8 to separately call and execute each of the SVC routines 80 and PC routines 82 against all test cases 72. The registers of the processing unit 16 are set up with the parameters of the test cases 72 by the software application 70. Since system integrity is intended to protect the system (i.e., the system code 75 operating system for the z/OS® software) against unauthorized users, these test cases 72 are executed unauthorized, in PSW key 8-15, and problem state.

Each run of the test cases 72 by the software application 70 against the respective SVC routines 80 and the PC routines 82 causes the system code 75 to generate an output (e.g., output 315 in FIG. 3) including log records 90. After each individual test case 72 is run, the software application 70 is configured to algorithmically analyze the output which includes log records 90 (including the percolated abends, as represented by System Diagnostic Work Area (SDWA)) for abends that reflect system integrity problems of the system code 75 at block 225. An abend is an unexpected termination that halts execution of the currently running program. An abend may occur when the computer is presented with instructions or data it cannot recognize, or a program tries to address memory beyond a defined boundary.

In addition, system key storage provided as input by the input parameters of the test cases 72 is tested for modification. Failures can be written to a file in persistent system storage 34 or memory 28, and the tester can re-run failing test cases to collect additional diagnostics, if needed.

The log records 90 are produced by the system code 75 that is driven by the test case 72 when abends occur. The log record 90 contains the address of the abending instruction, the PSW key at the time of abend, the registers at the time of abend, and whether the abend was on a fetch or store operation. The software application 70 is configured to extract information about the failure from the SDWA area of each log record 90 (generated while the PC routine 82 and/or SVC routine 80 was running) and/or SDWA (if an abend was percolated to the caller), and the software application 70 processes the extracted information to determine whether (and identify which of) the PC routines 82 and/or SVC routines 80 performed one of the following suspicious actions in Table 2. If a suspicious action was identified, the software application creates a report with the information from the log record 90, and additional information including the name and number of each SVC routine 80 and/or PC routine 82.

TABLE 2

1. A special abend code was issued that means caller provided code was branched to, and either:
   a) it contained system key, fetch protected code that was executed, or
   b) it was branched to in supervisor state or an authorized program key mask (the code was able to execute an SPKA instruction (set PSW key to 0-7) without abending).
2. A hardware program check was issued, the failing instruction was not IVSK, and one of the following is true:
   a) the instruction executed was MVCK, MVCP, or MVCSK and either:
     1) the fetch operation bit in SDWA (SDWAFOP) was on and bits 56-59 in the key register made a number less than 8 (the key register for MVCSK is register 1 and the MVCK and MVCP instructions specify which register is the key register), or
     2) the store operation bit in SDWA (SDWASOP) was on and the PSW key in SDWA (SDWAKEYA) was less than 8, or
   b) the instruction executed was MVCS or MVCDK and either:
     1) the store operation bit in SDWA (SDWASOP) was on and bits 56-59 in the key register made a number less than 8 (the key register for MVCSK is register 1 and the MVCK and MVCP instructions specify which register is the key register), or
     2) the fetch operation bit in SDWA (SDWAFOP) was on and the PSW key in SDWA (SDWAKEYA) was less than 8, or
   c) the instruction executed was any other instruction not previously mentioned and the PSW key in SDWA (SDWAKEYA) was less than 8.
3. If an input register or parameter pointed at system key storage, check whether the storage was changed. It is a clear system integrity vulnerability if a SVC or PC routine writes into this system key storage provided by the caller program.
4. The caller program got control back in an authorized state, which can be indicated by any of the following:
   a) Execution key. For example, the caller program receives control back in any PSW key 0-7, when the caller program (implemented by the software application 70) should have received control back in PSW key 8.
   b) Execution state. For example, the caller program receives control back in supervisor state.
   c) APF authorization state. For example, the caller program receives control back in an APF authorized state, when the caller program should have received control back in unauthorized state.
   d) Program key mask. For example, if any bit on the 16 bit program key mask (of the system code 75) representing the PSW keys 0-7 is set, having the bit set represents a system vulnerability that would be identified by the software application 70.

In Table 2, MVCSK stands for move with source key, which means that the storage being copied is accessed using the key located in bits 56-59 of general register 1. All references to callers parameters should be made in the key of the caller. MVCSK will abend if the storage being copied cannot be fetched with the specified key. Also, system key storage (in memory 28) has protection key 0-7 and requires access by a program with key 0-7.

In Table 2, IVSK stands for insert virtual storage key, MVCK stands for move with key, MVCS stands for move to secondary, MVCP stands for move to primary, and MVCDK stands for move with destination key.

Figure 3:
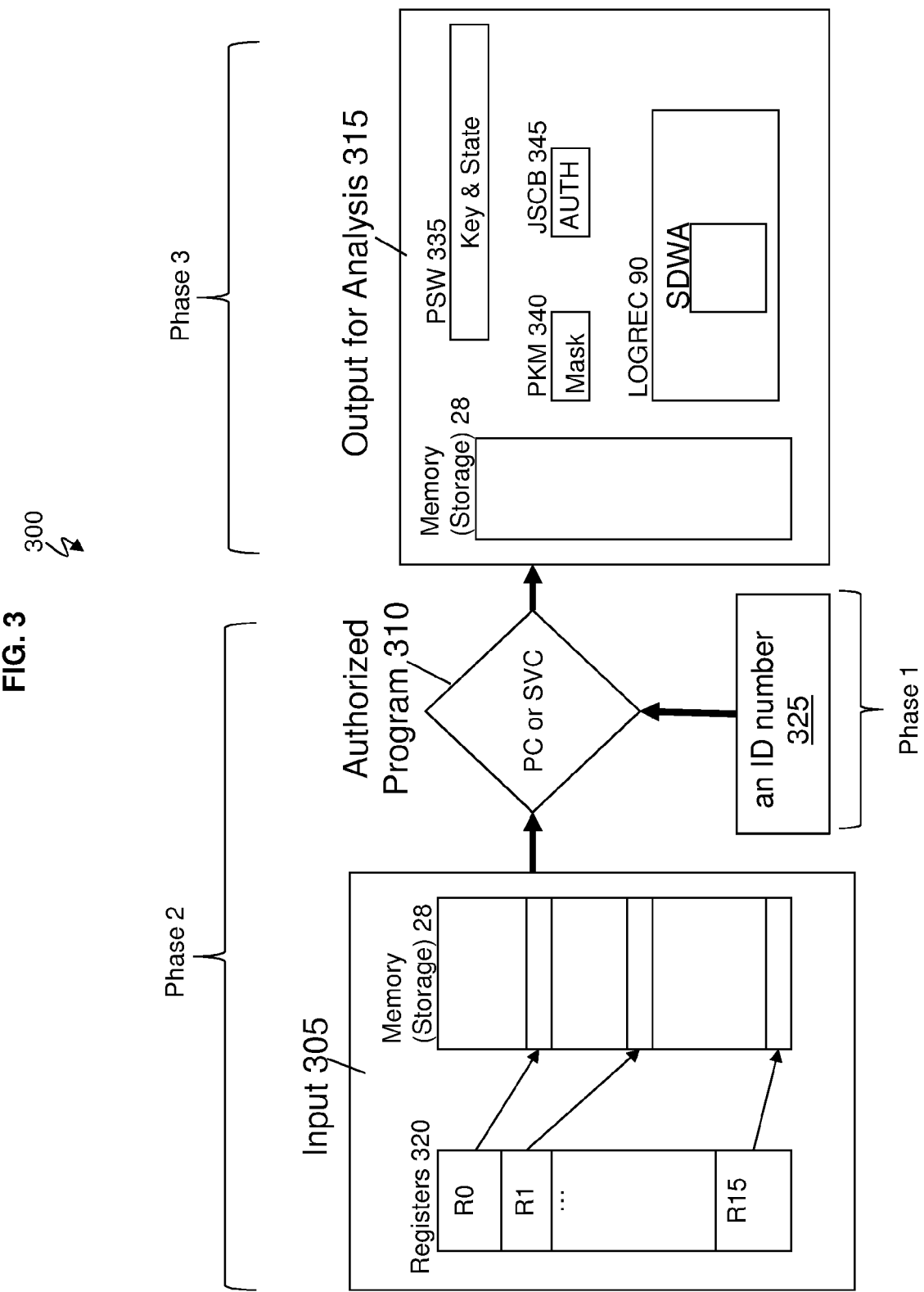
FIG. 3 illustrates a block diagram of test case input and output according to an exemplary embodiment.

FIG. 3 illustrates a block diagram 300 of the test case input and output according to an exemplary embodiment. The diagram 300 illustrates input 305 which include the predefined parameters of one individual test case 72 at a time, an authorized program 310 which is an individual SVC routine 80 and/or PC routine 82 that executes the input 305 at a time, and the output for analysis 315 (including log record 90) which is the output information after executing the test case 72.

The input 305 (of the software application 70) depicts registers 320 of the processing unit 16 filled with the input parameters of the test case 72, and the registers 320 may have values of addresses that point to storage (i.e. system key storage) in memory 28 and/or unallocated storage (which is not in the memory 28 and/or nonexistent). Table 1 above shows example input parameters for test cases 72 to be utilized by the software application 70 as the input 305.

The software application 70 acting as the unauthorized caller program utilizes the input 305 (in key 8) of the test case 72 to call the authorized program 310 for execution. The authorized program 310 is SVC routine 80 or PC routine 82, and is identified by a unique SVC or PC identification number obtained by the software application 70 during the preprocessing phase as discussed above. The input 305 from software application 70 causes the authorized program 310 to execute during the processing phase as discussed herein. The output 315 of the authorized program is displayed in FIG. 3 to be analyzed by the software application 70 during the post processing phase. The output 315 for analysis includes the storage memory 28, the log record 90, the program status word 335 (the PSW key and state), the program key mask 340, and the job step control block (JSCB, which is relevant to APF authorization) 345.

During the post processing phase, the software application 70 is configured to analyze the output 315 to determine if the test case 72 was able to cause the authorized program 310 (e.g., SVC routine 80 or PC routine 82) to perform one or more operations that the caller program (which is the same as the unauthorized program in PSW key 8-15) is not authorized to perform. When the test case 72 has input parameters that are designed to write to protected storage of memory 28, the software application 70 checks the memory 28 determine if the protected storage was written to (e.g., modified) by execution of the test case 72. This process repeats for each different test case 72 to be run against each different SVC routine 80 and PC routine 82, until all are respectively tested.

Some example suspicious output 315 looked for by the software application 70 is provided in Table 2 above. For example, considering item 4 of the Table 2, the software application 70 checks whether the caller program (which is implemented by the software application 70 itself) gained control back in PSW key 0-7, gained control back in supervisor state, gained control back in an authorized state, and/or gained control back with a program key mask (PKM) with bits set representing any of the PSW keys 0-7; any of which is noted as a system vulnerability of the system code 75 by the software application 70. For each test case 72 that reveals a system vulnerability, the software application 70 identifies the identification number 325 (e.g., 5) and name of the particular SVC routine 80 and/or PC routine 82 that was executed as the authorized program 310, along with the piece of code/instructions in the system code 75 where the suspicious action/operation occurred.

Now turning to FIGS. 4, 5, 6, and 7, these will be discussed as example input parameters (e.g., as input 305) of the test cases 72 that the software application 70 applies to the SVC routines 80 and PC routines 82 (i.e., authorized program 310) for execution. Although not shown for conciseness, each element from FIG. 3 is contemplated to be part of FIGS. 4, 5, 6, and 7.

Figure 4:
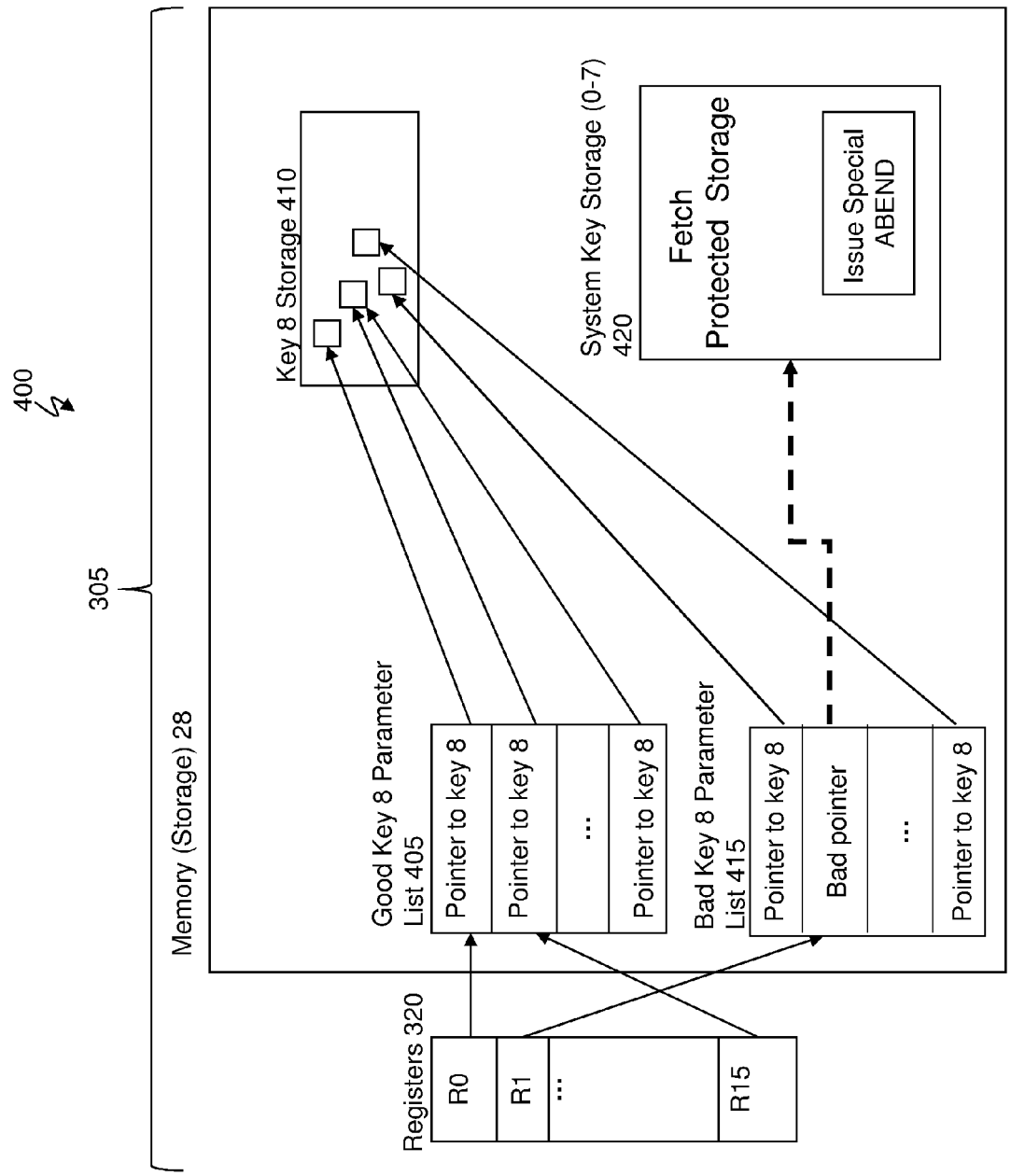
FIG. 4 illustrates a test case that attempts to cause execution of code in system key fetch protected storage according to an exemplary embodiment.

FIG. 4 is a block diagram 400 of an example test case 72 (by the software application 70 as the caller program with key 8) that attempts to cause execution of system code 75 in system key (i.e., key 0-7) fetch protected storage according to an exemplary embodiment. In FIG. 4, input 305 shows the input parameters for a test case 72 that results in the system vulnerability item 1a in Table 2 as determined and flagged by the software application 70. In FIG. 4, register R0 points to a good key 8 parameter list 405 and each of the pointers in the parameter list 405 points to key 8 storage 410 in memory 28. This is acceptable because the caller program has a key 8 permission for the key 8 storage 410. However, the test case 72 sets register R1 to point to a bad key 8 parameter list 415 with a bad pointer. This pointer is bad because, if the particular SVC routine 80 or PC routine 82 branches to (executes the code at) this address without abending, it allows the unauthorized caller to reveal the contents of fetch protected storage (610). Since the system key storage (key 0-7) 420 is fetch protected storage, the SVC routine 80 and/or PC routine 82 should not have fetched (allowed the caller program to view the contents) the fetch protected storage on behalf of the caller program (with key 8). In one case, the system code 75 issues a special abend operation/instruction which causes the entire process to terminate, and this abend is logged in the log record (report) 90 of the output 315. The software application 70 analyzes the log record 90 to determine that this system vulnerability (violation) has occurred, because the software application 70 compares the expected results based on the input parameters (the caller program should be blocked from fetching the fetch protected storage) against the actual results (bad pointer fetches the fetch protected storage). The software application 70 parses the special abend code to determine that the caller program provided code/instruction in the register R1 second parameter was branched to and the address location (at the system key storage (0-7) 420) contained system key 0-7 fetch protected code that was executed.

Figure 5:
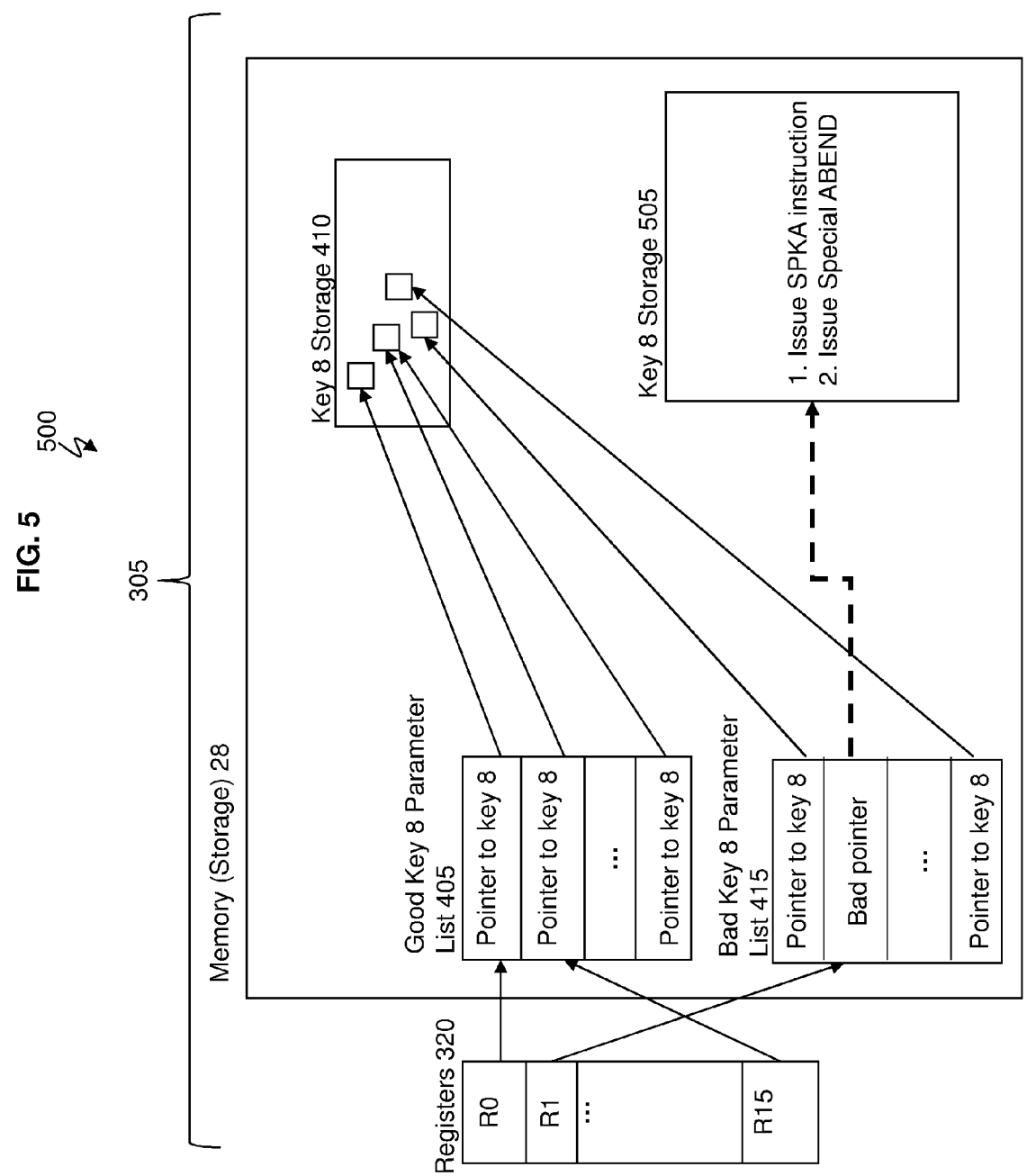
FIG. 5 illustrates a test case that attempts to cause execution of code in supervisor state according to an exemplary embodiment.

FIG. 5 is a block diagram 500 of an example test case 72 (by the software application 70 as the caller program with key 8) that attempts to cause execution of system code 75 in supervisor state according to an exemplary embodiment. During post processing, the software application 70 is configured to determine when the test case 72 caused the SVC routine 80 or the PC routine 82 to execute the instructions of the key 8 storage 505 in the supervisor state or with an authorized program key mask. If so, this is flagged as a system vulnerability of the system code 75 (operating system). The reason the software application 70 knows the SVC routine 80 or PC routine 82 was in supervisor state or had an authorized program key mask is because the SPKA instruction (set PSW key from address) did not abend.

In FIG. 5, input 305 shows the input parameters for a test case 72 that results in the system vulnerability item 1b in Table 2 as determined by the software application 70. In FIG. 5, register R0 points to a good key 8 parameter list 405, and each of the pointers in the parameter list 405 points to key 8 storage 410 in memory 28. This is acceptable because the caller program (implemented by software application 70) has a key 8 permission for the key 8 storage 410. However, the test case 72 reveals that register R1 points to a bad key 8 parameter list 415 with a bad pointer. The pointer is bad because the authorized program 310 executes (and/or attempts to execute) a SPKA instruction in supervisor state, via the authorized program 310 (i.e., the SVC routine 80 and/or PC routine 82 being tested). The SPKA instruction stands for set PSW key from address, which could improperly allow the caller program to change its PSW key from key 8-15 to key 0-7. By reviewing the log record 90, the software application 70 is configured to check and determine that the test case 72 was able to cause the authorized program 310 (SVC or PC) to execute code provided by the caller in supervisor state or with an authorized program key mask; however, the caller program is unauthorized and should not have supervisor state or an authorized program key mask. If the SPKA instruction does not abend, a special abend code is issued to communicate to the software application 70 that the SPKA instruction was successful.

Figure 6:
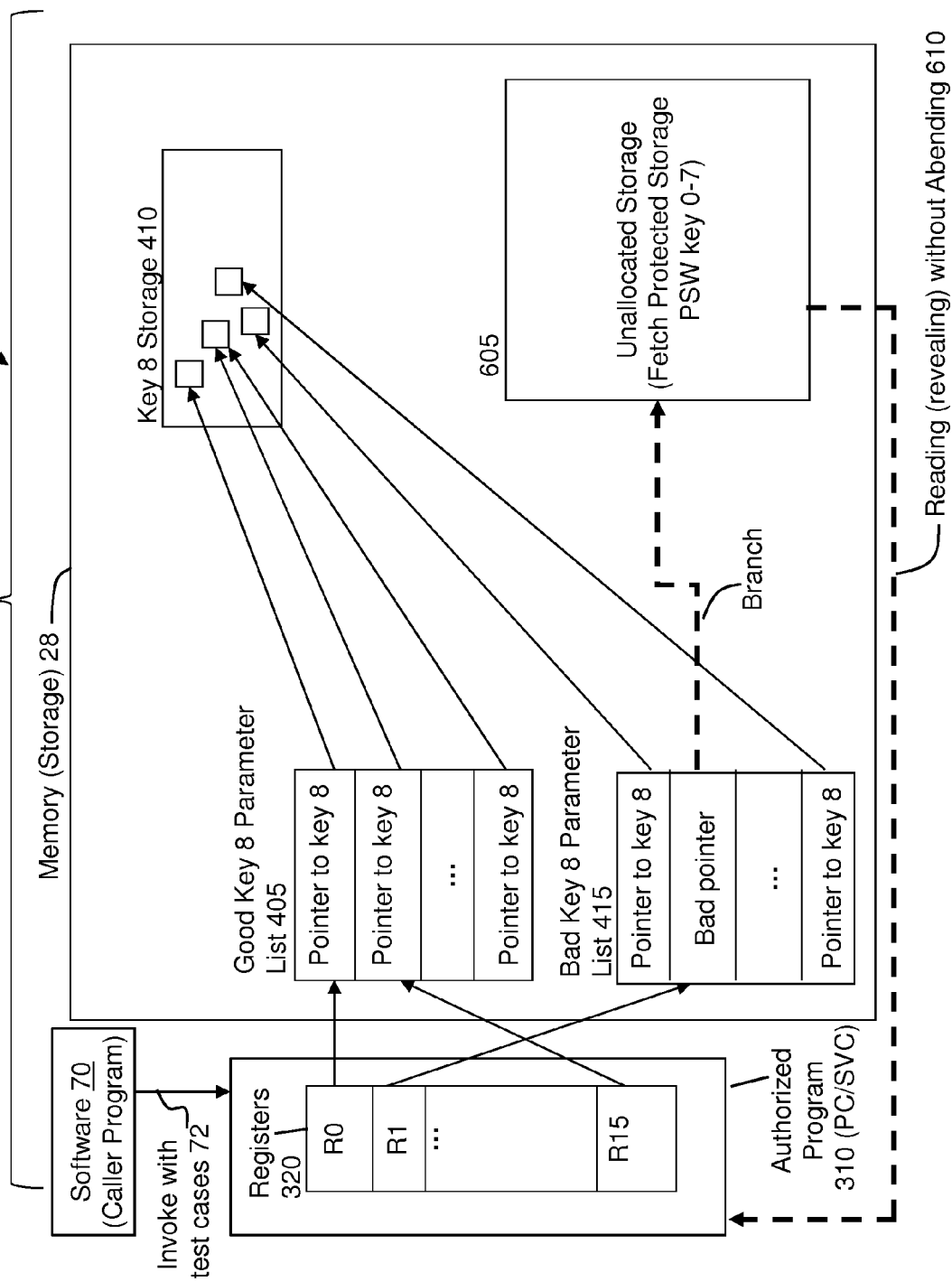
FIG. 6 illustrates a test case that provides an address for unallocated storage to attempt to cause an abend operation according to an exemplary embodiment.

FIG. 6 is a block diagram 600 of an example test case 72 (by the software application 70 as the caller program with key 8) provides (reference to) unallocated storage to attempt to cause an abend operation by the system code 75 according to an exemplary embodiment. FIG. 6 illustrates discovery of the system vulnerability (by the software application 70) of item 2 in Table 2. This test case 72 is designed to cause execution of the system code 75 (via SVC routine 80 and/or PC routine 82) to point to (the address location of) unallocated storage 605, causing an abend and resulting log record. The unallocated storage 605 does not exist in the memory 28 and there is nothing at the address. If the test case 72 can cause the authorized program 310 to access unallocated storage 605 as described in in item 2 of Table 2, then an unauthorized caller may be able to cause the authorized program 310 to access storage that the unauthorized program would otherwise not be able to access. Further, the software application 70 is configured to recognize when the caller program attempts to access unallocated storage with an effective key zero through seven. The effective key is either the PSW key and/or a key specified with an instruction that allows a key register to be specified (i.e., MVCSK, MVCDK, MVCK, MVCP, and MVCS). The effective key overrides the PSW key.

When reviewing the (abend instruction) log record 90 during post processing, the software application 70 is configured to determine that the test case 72 caused the SVC routine 80 and/or the PC routine 82 to execute an instruction that accessed the unallocated storage 605, and the software application 70 flags this as a system vulnerability of the system code 75 (operating system) if the abend occurred subject to the rules in Table 2 item 2.

Figure 7:
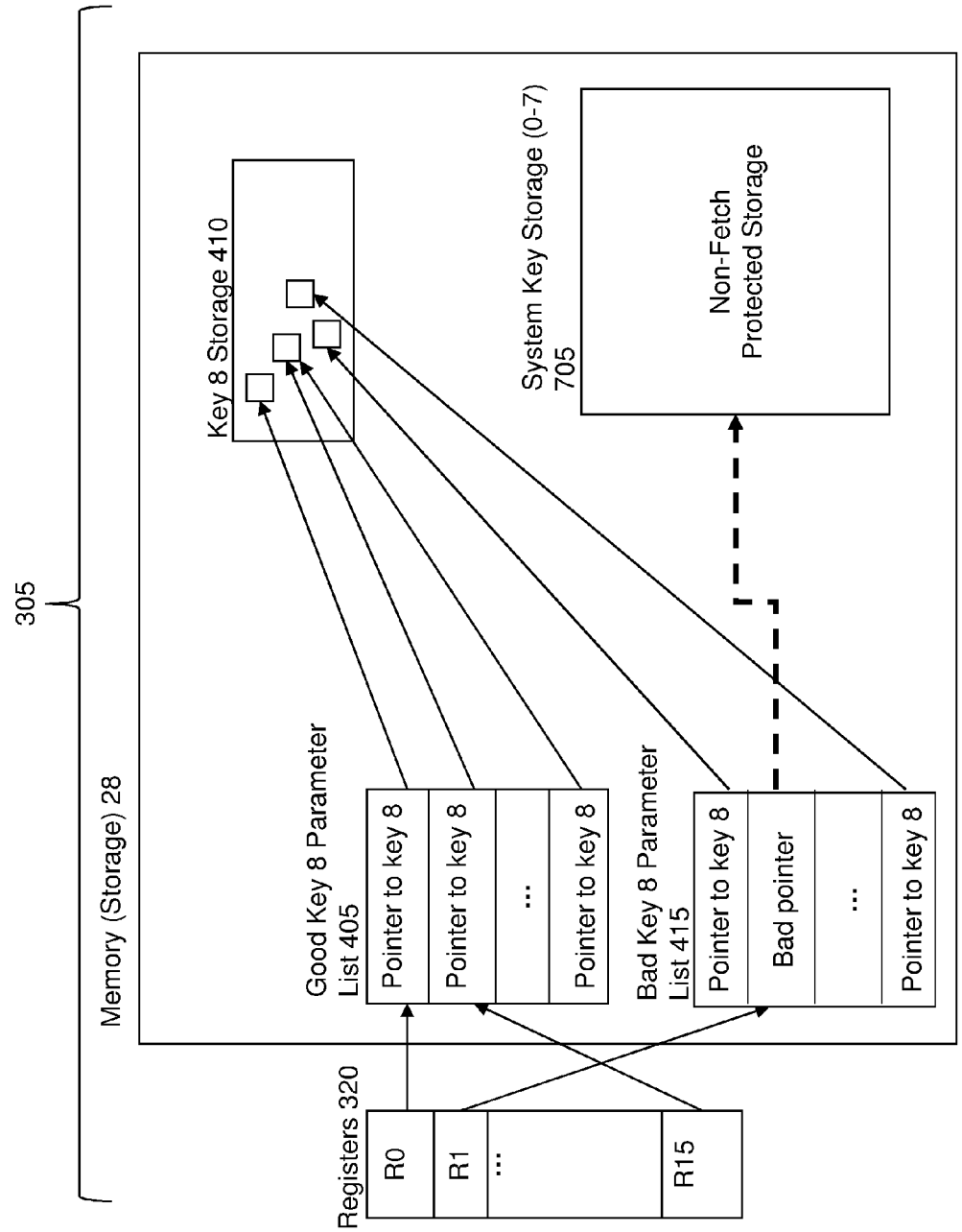
FIG. 7 illustrates a test case that provides an address to system key storage to attempt to cause invalid storage modification according to an exemplary embodiment.

FIG. 7 is a block diagram 700 of an example test case 72 (by the software application 70 as the caller program with key 8) in which the parameters provide the memory address for system key storage (0-7) 705 to attempt to cause invalid storage modification according to an exemplary embodiment.

During post processing, the software application 70 is configured to determine that the test case 72 caused the SVC routine 80 and/or the PC routine 82 to invalidly write to the system key (key 0-7) storage 705, and the software application 70 flags this as a system vulnerability. This system vulnerability is item 3 in the Table 2. The register R1 pointed to a bad pointer in the bad key 8 parameter list 415. This bad pointer allowed the authorized program 315 (as directed by the caller program in key 8) to improperly access and modify the system key (key 0-7) storage 705.

Various examples of input 305 as test cases 72 and output 315 analyzed by the software application 70 have been discussed herein. These examples are provided for explanation purposes and are not meant to be limiting. It is understood that various test cases may be defined to produce the desired output according to the present disclosure.

FIG. 8 is a method 800 by software application 70 for providing test cases and analyzing results to determine system vulnerabilities in the system code 75 by using an SVC routine 80 and/or a PC routine 82 (which are authorized programs 310) according to an exemplary embodiment. The software application 70 may include one or more algorithms configured to operate as discussed herein.

At block 805, the software application 70 on the computer system/server 12 is configured to analyze a list of supervisor call routines (in the SVC table 81) and a list of program call routines (in the PC table 83) of the system code 75 to extract the supervisor call routines 80 (out of the table 81) and the program call routines 82 (out of the table 83) that are available to the unauthorized program. The unauthorized program (i.e., caller program) has a PSW key 8-15.

The software application 70 on the computer system/server 12 is configured to provide predefined input parameters (such as, e.g., input 305) of test cases (e.g., the test cases 72) for execution by each individual one of the supervisor call routines 80 and each individual one of the program call routines 82 in order to generate an output (such as, e.g., the output 315) for analysis at block 810.

The software application 70 on the computer system/server 12 is configured to analyze the output (e.g., output 315 which includes log record/report 90) to determine when at least one of the supervisor call routines 80 and the program call routines 82 performed a potential vulnerability action at block 815. The potential vulnerability action includes reading from fetch protected storage, writing to system key (key 0-7) storage, giving control to the caller program of a program call routine or a supervisor call routine in an authorized state, and/or attempting to access unallocated storage with an effective key zero through seven at block 820. Additionally, the potential vulnerability action includes receiving control by the caller program in at least one of a different execution key than the caller program key, a different execution state than an original execution state for the caller program, an authorization state, and with bits of a program key mask being set for higher authority than a unauthorized caller.

Further, the caller program (implemented by the software application 70) is in an unauthorized state, and the unauthorized state does not authorize the caller program to cause the potential vulnerability action; accordingly, by determining that the potential vulnerability action has occurred, the software application 70 determines that the particular supervisor call routine 80 being tested and/or the particular program call routine 82 being tested of the system code 75 violates system integrity.

The caller program is a PSW key eight through fifteen (e.g., PSW key 8) program with lower authority than a program running with PSW key zero through seven (i.e., PSW key 0-7), and the key of the caller program (being simulated by the software application 70) does not authorize the caller program to cause the (potential) vulnerability action to occur; accordingly, by determining that the potential vulnerability action has occurred, the software application 70 determines that the particular supervisor call routine 80 being tested and/or the particular program call routine 82 being tested of the system code 75 violates system integrity.

Having the software application 70 analyze the supervisor call routines listed in the SVC table 81 and the program call routines listed in the PC table 83 of the system code 75 includes the software application 70 determining the supervisor call routines 80 which can be accessed by the unauthorized program having the PSW key of key eight through fifteen and determining the program call routines 82 which can be accessed by the unauthorized program having the PSW key of key eight through fifteen.

The predefined input parameters of the test cases 72 are defined to cause the supervisor call routines 80 and the program call routines 82 to perform the potential vulnerability action (i.e., the suspicious actions) discussed herein. The output (e.g., output 315 which includes log records 90) of running the test cases 72 includes a supervisor call routine name and a supervisor call routine number uniquely identifying the supervisor call routines 80 being tested, a program call routine name and a program call routine number uniquely identifying the program call routines 82 being tested, what instruction failed in the program call routines 82, what instruction failed in the supervisor call routines 80, and/or an address location for addresses accessed and attempted to be accessed during the test cases.

Exemplary embodiments are configured to scan for and detect system code 75 that violates z/OS® System Integrity Guidelines. Compared to previous solutions, the disclosed technique requires less maintenance and is more accurate. Finally, the algorithm used to check SDWA and log records for system integrity concerns can be applied in many different ways. For example, the algorithm can be modified to adjust the sensitivity from near 100% certainty down depending on the machine resources or human expertise available for analysis. The algorithm used to analyze SDWA and log records can be unconnected from the test cases and applied to log records, as a whole, or any comparable data that is gathered as a result of execution, including system dumps, CEE dumps (occurs when the z/OS® Language Environment® encounters an error), and slip dumps. This technique can be applied to various scenarios such as: 1. A customer could periodically scan log records to detect system integrity violations and hopefully stop hackers before they could exploit one. 2. A test group could run post-processing on log records after executing their test cases to ensure their system code is secure. 3. Real-time analysis could be coded in Recovery Termination Manager (RTM), or an extension to RTM, to generate System Management Facility (SMF) records or health check messages in response to system integrity violations. Also, the technique can be included in a future health check function or as a service for identifying vulnerabilities in vendor or customer code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting vulnerabilities in system code on a computer, the method comprising:

analyzing, by the computer, supervisor call routines and program call routines of the system code to determine the supervisor call routines and the program call routines that are available to a caller program, the caller program being an unauthorized program and having a program status word (PSW) key eight through fifteen;

providing, by the computer, predefined input parameters of test cases for execution by each of the supervisor call routines and the program call routines in order to generate an output for analysis; and analyzing, by the computer, the output to determine when at least one of the supervisor call routines and the program call routines performed a potential vulnerability action, the potential vulnerability action comprising:

reading from fetch protected storage when a register points to a bad key 8 parameter list with a bad pointer, by running the test cases in which the caller program causes one supervisor call routine or one program call routine to branch to the fetch protected storage related to the bad pointer of the bad key 8 parameter list during execution without abending;

wherein the bad pointer in the bad key 8 parameter list is defined to be bad because the one supervisor call routine or the one program call routine branches, on behalf of the caller program having PSW key eight through fifteen, to the fetch protected storage protected by the PSW key zero through seven without abending;

writing to system key storage having PSW key zero through seven by the one supervisor call routine or the one program call routine;

giving control to the caller program of a program call routine or a supervisor call routine in an authorized state;

unauthorizedly receiving control by the caller program in the PSW key zero through seven, by running the test cases in which the caller program causes the one supervisor call routine or the one program call routine to branch to the fetch protected storage related to the bad pointer of the bad key 8 parameter list during execution without abending;

wherein unauthorizedly receiving control b the caller program in the PSW key zero through seven means that the caller program has gained control in an authorized state which corresponds to the PSW key zero through seven, when the caller program was initially in the unauthorized state which corresponds to the PSW key eight through fifteen;

wherein control relates to the caller program invoking or calling the one supervisor call routine or the one program call routine.

2. The method of claim 1, wherein the potential vulnerability action further comprises at least one of:

accessing system key storage in an effective key other than the PSW key of the caller program; and receiving control by the caller program in at least one of a different execution state than an original execution state for the caller program, an authorization state, and with bits of a program key mask being set for higher authority than an unauthorized program authority.

3. The method of claim 1, wherein the caller program is in an unauthorized state;

wherein the unauthorized state does not authorize the caller program to cause the potential vulnerability action; and wherein by determining that the potential vulnerability action has occurred, the computer determines that at least one of a particular supervisor routine and a particular program call routine of the system code violates system integrity.

4. The method of claim 1, wherein the PSW key eight through fifteen for the caller program has lower authority than a program with the PSW key zero through seven;
   wherein the PSW key eight through fifteen for the caller program does not authorize the caller program to cause the potential vulnerability action; and
   wherein by determining that the potential vulnerability action has occurred, the computer determines that at least one of a particular supervisor routine and a particular program call routine of the system code violates system integrity.

5. The method of claim 1, wherein the computer analyzing the supervisor call routines and the program call routines of the system code comprises determining the supervisor call routines that can be accessed by the unauthorized program having the PSW key eight through fifteen and determining the program call routines that can be accessed by the unauthorized program having the PSW key eight through fifteen.

6. The method of claim 1, wherein the predefined input parameters of the test cases are defined to cause the supervisor call routines and the program call routines to perform the potential vulnerability action which comprises at least one of:
   reading from fetch protected storage;
   writing to system key storage having the PSW key zero through seven;
   attempting to access unallocated storage while running with the PSW key zero through seven;
   accessing storage identified by the caller program in an effective key other than the PSW key of the caller program; and
   receiving control by the caller program in at least one of a different execution key than the PSW key of the caller program, a different execution state than an original execution state for the caller program, an authorization state, and with bits of a program key mask being set for higher authority than an unauthorized caller program.

7. The method of claim 1, wherein the output of running the test cases comprises:
   a supervisor call routine name and a supervisor call routine number for the supervisor call routines;
   a program call routine name and a program call routine number for the program call routines;
   what instruction failed in the program call routines; and
   what instruction failed in the supervisor call routines.

8. A system for detecting vulnerabilities in system code, comprising:
   memory configured to store a program; and a processor, functionally coupled to the memory, the processor being responsive to computer-executable instructions contained in the program and operative to:
   analyze, by the processor, supervisor call routines and program call routines of the system code to determine the supervisor call routines and the program call routines that are available to a caller program, the caller program being an unauthorized program and having a program status word (PSW) key eight through fifteen;
   provide, by the processor, predefined input parameters of test cases for execution by each of the supervisor call routines and the program call routines in order to generate an output for analysis; and
   analyze, by the processor, the output to determine when at least one of the supervisor call routines and the program call routines performed a potential vulnerability action, the potential vulnerability action comprising:
   reading from fetch protected storage when a register points to a bad key 8 parameter list with a bad pointer, by running the test cases in which the caller program causes one supervisor call routine or one program call routine to branch to the fetch protected storage related to the bad pointer of the bad key 8 parameter list during execution without abending;
   wherein the bad pointer in the bad key 8 parameter list is defined to be bad because the one supervisor call routine or the one program call routine branches, on behalf of the caller program having PSW key eight through fifteen, to the fetch protected storage protected by the PSW key zero through seven without abending;
   writing to system key storage having a PSW key zero through seven by the one supervisor call routine or the one program call routine;
   giving control to the caller program of a program call routine or a supervisor call routine in an authorized state;
   unauthorizedly receiving control by the caller program in the PSW key zero through seven, by running the test cases in which the caller program causes the one supervisor call routine or the one program call routine to branch to the fetch protected storage related to the bad pointer of the bad key 8 parameter list during execution without abending;
   wherein unauthorizedly receiving control by the caller program in the PSW key zero through seven means that the caller program has gained control in an authorized state which corresponds to the PSW key zero through seven, when the caller program was initially in the unauthorized state which corresponds to the PSW key eight through fifteen;
   wherein control relates to the caller program invoking or calling the one supervisor call routine or the one program call routine.

9. The system of claim 8, wherein the potential vulnerability action further comprises at least one of:
   accessing system key storage in an effective key other than the caller program key; and
   receiving control by the caller program in at least one of a different execution key than the PSW key of the caller program, a different execution state than an original execution state for the caller program, an authorization state, and with bits of a program key mask being set for higher authority than an unauthorized caller program.

10. The system of claim 8, wherein the caller program is in an unauthorized state;
   wherein the unauthorized state does not authorize the caller program to cause the potential vulnerability action;
   wherein by determining that the potential vulnerability action has occurred, the processor determines that at least one of a particular supervisor routine and a particular program call routine of the system code violates system integrity.

11. The system of claim 8, wherein the PSW key eight through fifteen for the caller program has lower authority than a program with the PSW key zero through seven;
   wherein the PSW key eight through fifteen for the caller program does not authorize the caller program to cause the potential vulnerability action; and
   wherein by determining that the potential vulnerability action has occurred, the computer determines that at least one of a particular supervisor routine and a particular program call routine of the system code violates system integrity.

12. The system of claim 8, wherein the processor analyzing the supervisor call routines and the program call routines of the system code comprises determining the supervisor call routines that can be accessed by the unauthorized program having the PSW key eight through fifteen and determining the program call routines that can be accessed by the unauthorized program having the PSW key eight through fifteen.

13. The system of claim 8, wherein the predefined input parameters of the test cases are defined to cause the supervisor call routines and the program call routines to perform the potential vulnerability action which comprises at least one of:
   reading from fetch protected storage;
   writing to system key storage having the PSW key zero through seven;
   attempting to access unallocated storage while running with the PSW key zero through seven;
   accessing storage identified by the caller program in an effective key other than the PSW key of the caller program; and
   receiving control by the caller program in at least one of a different execution key than the PSW key of the caller program, a different execution state than an original execution state for the caller program, an authorization state, and with bits of a program key mask being set for higher authority than an unauthorized caller program.

14. The system of claim 8, wherein the output of running the test cases comprises:
   a supervisor call routine name and a supervisor call routine number for the supervisor call routines;
   a program call routine name and a program call routine number for the program call routines;
   what instruction failed in the program call routines; and
   what instruction failed in the supervisor call routines.

15. A computer program product for detecting vulnerabilities in system code on a computer, the computer program product comprising:
   a non-transitory computer readable storage medium having computer readable program code embodied therewith, the computer readable program code comprising:
   analyzing, by the computer, supervisor call routines and program call routines of the system code to determine the supervisor call routines and the program call routines that are available to a caller program, the caller program being an unauthorized program and having a program status word (PSW) key eight through fifteen;
   providing, by the computer, predefined input parameters of test cases for execution by each of the supervisor call routines and the program call routines in order to generate an output for analysis; and
   analyzing the output to determine when at least one of the supervisor call routines and the program call routines performed a potential vulnerability action, the potential vulnerability action comprising:
   reading from fetch protected storage when a register points to a bad key 8 parameter list with a bad pointer, by running the test cases in which the caller program causes one supervisor call routine or one program call routine to branch to the fetch protected storage related to the bad pointer of the bad key 8 parameter list during execution without abending;
   wherein the bad pointer in the bad key 8 parameter list is defined to be bad because the one supervisor call routine or the one program call routine branches, on behalf of the caller program having PSW key eight through fifteen, to the fetch protected storage protected by the PSW key zero through seven without abending;
   writing to system key storage having PSW key zero through seven by the one supervisor call routine or the one program call routine;
   giving control to the caller program of a program call routine or a supervisor call routine in an authorized state;
   unauthorizedly receiving control by the caller program in the PSW key zero through seven, by running the test cases in which the caller program causes the one supervisor call routine or the one program call routine to branch to the fetch protected storage related to the bad pointer of the bad key 8 parameter list during execution without abending;
   wherein unauthorizedly receiving control by the caller program in the PSW key zero through seven means that the caller program has gained control in an authorized state which corresponds to the PSW key zero through seven, when the caller program was initially in the unauthorized state which corresponds to the PSW key eight through fifteen;
   wherein control relates to the caller program invoking or calling the one supervisor call routine or the one program call routine.

16. The computer program product of claim 15, wherein the potential vulnerability action further comprises at least one of:
   accessing system key storage in an effective key other than the PSW key of the caller program; and
   receiving control by the caller program in at least one of a different execution key than the PSW key of the caller program, a different execution state than an original execution state for the caller program, an authorization state, and with bits of a program key mask being set for higher authority than an unauthorized program authority.

17. The computer program product of claim 15, wherein the caller program is in an unauthorized state;
   wherein the unauthorized state does not authorize the caller program to cause the potential vulnerability action; and
   wherein by determining that the potential vulnerability action has occurred, the computer determines that at least one of a particular supervisor routine and a particular program call routine of the system code violates system integrity.

18. The computer program product of claim 15, wherein the PSW key eight through fifteen for the caller program has lower authority than a program with the PSW key zero through seven;
   wherein the PSW key eight through fifteen for the caller program does not authorize the caller program to cause the potential vulnerability action; and
   wherein by determining that the potential vulnerability action has occurred, the computer determines that at least one of a particular supervisor routine and a particular program call routine of the system code violates system integrity.

19. The computer program product of claim 15, wherein the computer analyzing the supervisor call routines and the program call routines of the system code comprises determining the supervisor call routines that can be accessed by the unauthorized program having the PSW key eight through fifteen and determining the program call routines that can be accessed by the unauthorized program having the PSW key eight through fifteen.

20. The computer program product of claim 15, wherein the predefined input parameters of the test cases are defined to cause the supervisor call routines and the program call routines to perform the potential vulnerability action which comprises at least one of:
   reading from fetch protected storage;
   writing to system key storage having the PSW key zero through seven;

attempting to access unallocated storage while running with the PSW key zero through seven;

accessing storage identified by the caller program in an effective key other than the PSW key of the caller program; and receiving control by the caller program in at least one of a different execution key than the PSW key of the caller program, a different execution state than an original execution state for the caller program, an authorization state, and with bits of a program key mask being set for higher authority than an unauthorized caller program.

21. The computer program product of claim 15, wherein the output of running the test cases comprises:

a supervisor call routine name and a supervisor call routine number for the supervisor call routines a program call routine name and a program call routine number for the program call routines;

what instruction failed in the program call routines; and what instruction failed in the supervisor call routines.

\* \* \* \* \*